3,383,451
SIGNAL GENERATING APPARATUS
Leslie B. Robinson, Edmonds, Wash., Morris H. Stephenson, Jr., Claremont, Calif., and Richard R. Stockman and Charles S. Walker, Seattle, Wash., assignors to Honeywell Inc., Minneapolis, Minn., a corporation of Delaware
Filed Dec. 14, 1966, Ser. No. 601,723
7 Claims. (Cl. 35—10.4)

ABSTRACT OF THE DISCLOSURE

A circuit for generating apparently random "blotches" on a CRT display. The circuit comprises two pseudorandom pulse sequence generators one of which controls intensity of the pulses and the other controls angles on the spiral sweep display. The pseudorandom intensity generator normally allows a plurality of pulses of a given angle to pass such that a given angle is illuminated on several successive revolutions of the spiral sweep.

---

The present invention relates generally to electronic circuitry and more specifically to circuitry producing a target of apparent randomness on the surface of a display.

While reverberation simulation generators have been produced in the past, these reverberation generators have not produced sufficiently realistic reverberation blotches. This defect is cured with the present invention by allowing the presentation of the blotch to be formed through the use of several successive revolutions of a spiral sweep CRT (cathode ray tube) rather than a single revolution as has previously been used. In addition, rather than having a completely random signal such as a white noise generator produce the blotch information, the present invention uses pseudorandom voltage generators to vary the angle of the signal being applied to the intensity grid of the CRT while using a further pseudorandom generating means to determine the amplitude of the first mentioned random signal as applied to the grid of the CRT.

It is therefore an object of this invention to provide improved reverberation simulation display apparatus.

Figure 1:
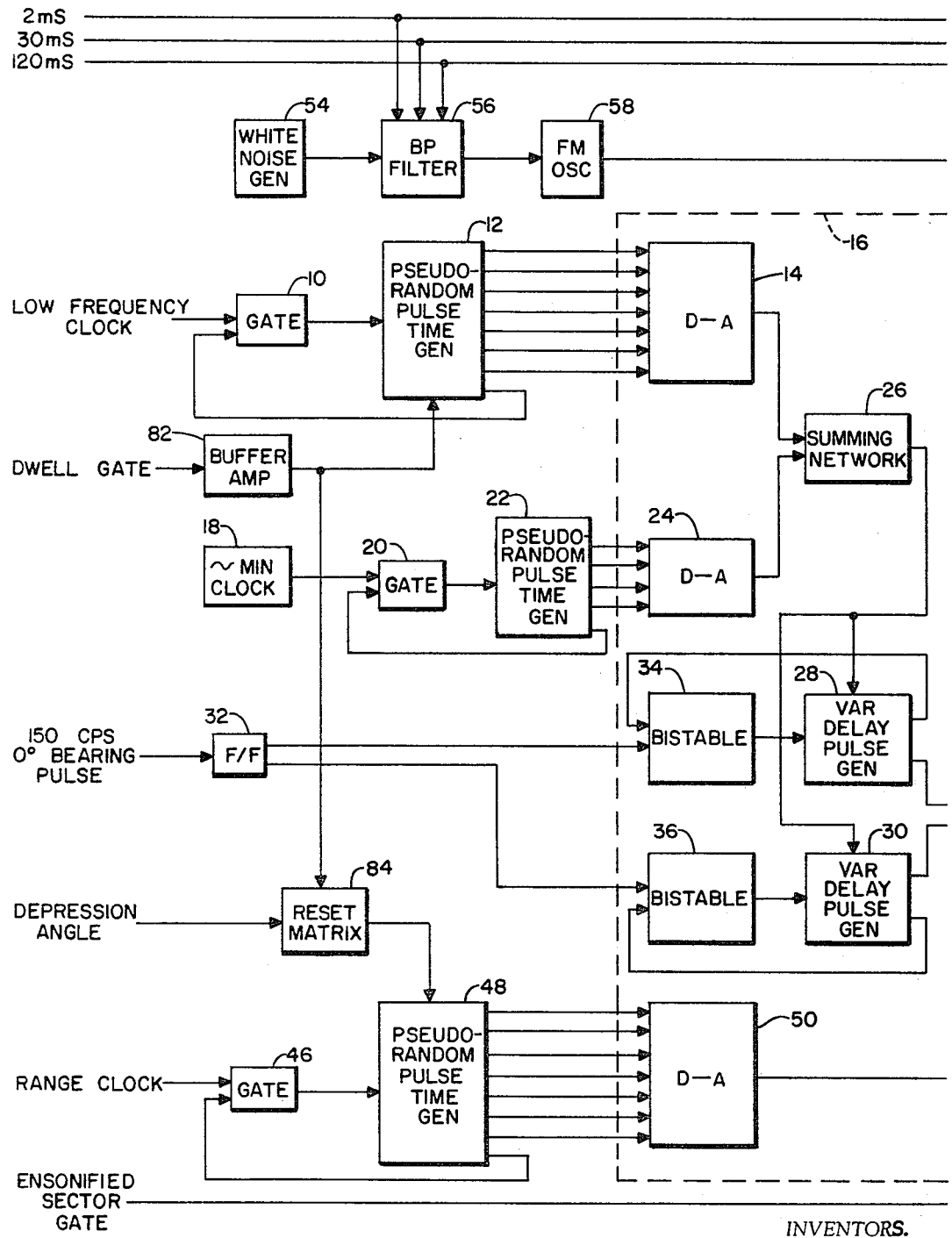
Figure 2:
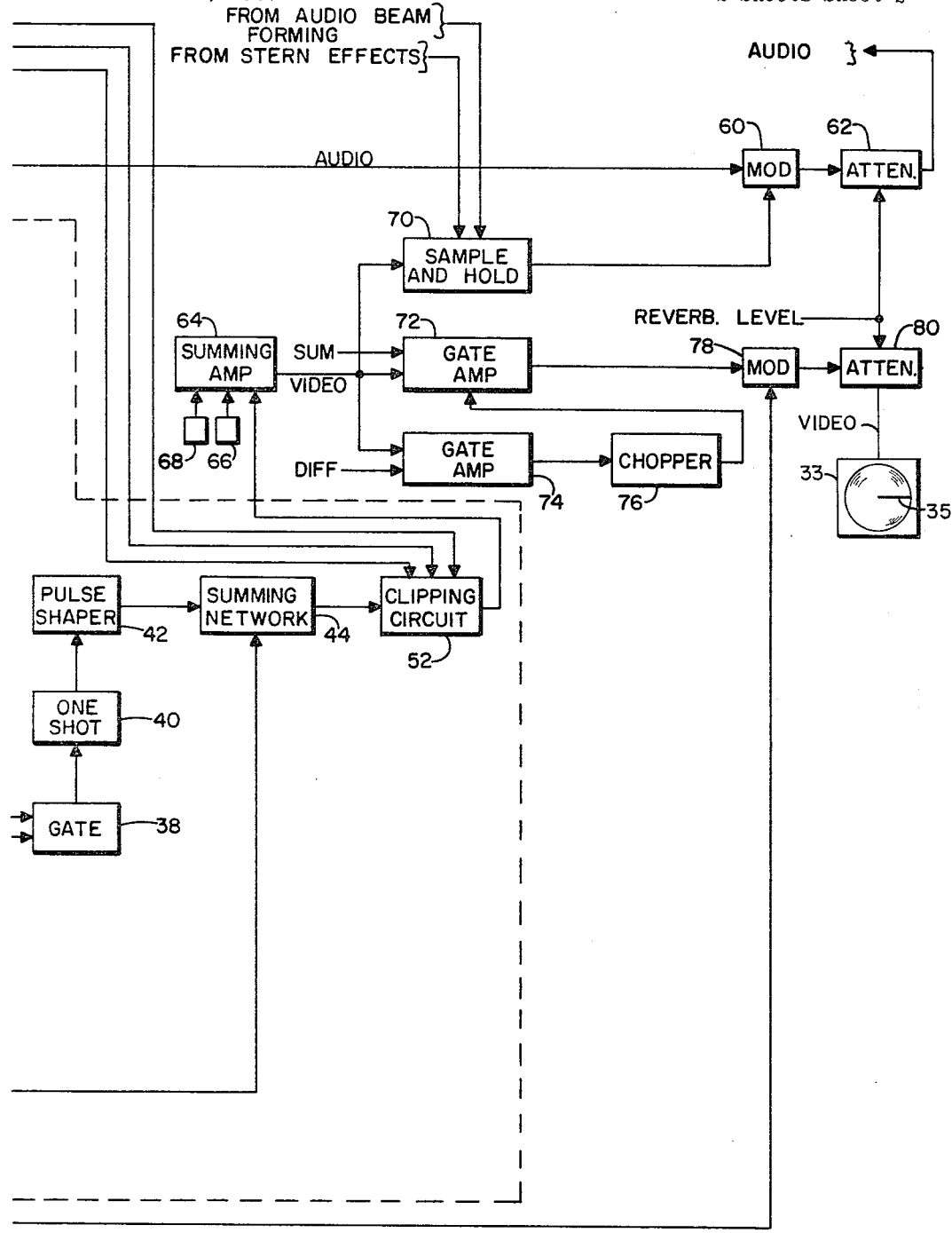

Further objects and advantages of this invention will be apparent from a reading of the specification and attached claims is in conjunction with the drawings wherein:

FIGURE 1 and FIGURE 2 comprise a complete block diagram of the invention with FIGURE 1 generally containing the preliminary signal generating circuitry and FIGURE 2 containing the later circuitry immediately prior to the CRT display.

A low frequency clock pulse is shown being applied to a gate 10. An output from the gate 10 is used to actuate a psuedorandom pulse time generator 12 which has a plurality of outputs being applied to a digital-to-analog converter 14 contained within dash lines 16. The generator 12 and gate 10 form a shift register, pseudorandom pulse sequence generator. This is a standard procedure as shown in the University of Michigan Institute (1958) EDG Technical Report No. 90, "Introduction to Linear Shift Register Generated Sequences," Birdsall and Ristenbatt. An approximately one cycle per minute clock pulse generator 18 applies an input to a second shift register pseudorandom pulse sequence generator 22 through gate 20. Random generator 22 has a plurality of outputs applied to a digital-to-analog converter 24. Outputs of the two digital-to-analog converters 14 and 24 are applied to a summing network 26.

In the particular embodiment being shown the summing network is weighted such that the effect of digital-to-analog converter 24 is three times that of converter 14. As will be realized, the converter could have been designed such that its output is merely three times as large as that of converter 14 and the summing network merely providing a summing function.

An output of summing network 26 is applied to two variable delay pulse generorots 28 and 30. A zero degree bearing pulse is applied to a flip-flop 32 while outputs from flip-flop 32 are applied to bistable circuits 34 and 36. An output of bistable circuit 34 is applied to a second input of pulse generator 28 which has one output being used to reset the bistable circuit 34. An output of bistable circuit 36 is applied to a second input of pulse generator 30 which has an output providing a second input to bistable circuit 36 for reset purposes. The flip-flop 32 is actuated as the sweep circuit on a CRT 33 (shown in FIGURE 2), passes through a zero degree reference (shown as 35 in FIGURE 2). The bearing pulse actuates the variable delay pulse generators on alternate occasions as the sweep circuit passes through the zero reference and allows the variable delay pulse generators to start their timing function in accordance with the amplitude of the signal received from summing network 26. Thus, the bearing pulse is synchronized with the sweep signals. Outputs from the generators 28 and 30 are applied to a gate 38 and from there through a one shot 40 and a pulse shaper 42 to a summing network 44.

A third clock provides an input through a gate 46 which with the feedback connection forms a third psuedorandom pulse sequence generator in conjunction with generator 48 which has a plurality of outputs applied to a digital-to-analog converter 50. An output of converter 50 is applied as a second input to summing network 44. The amplitude of the output signal from converter 50 is summed with the amplitude of the signal being transmitted from pulse shaper 42 through summing network 44. The composite signal from network 44 is applied as an input to clipping circuit 52.

A white noise generator 54 is shown applying a signal to a bandpass filter 56. An output of the bandpass filter 56 is passed through a frequency modulated oscillator 58 to a modulator 60 and then to an attenuator 62. While the components 54–62 do not form part of the invention they are shown to provide a more complete disclosure. These components are merely a part of the audio section to be used by the person using the invention as a simulator to provide audio signals corresponding with the visual signals appearing on the display 33. A plurality of inputs labeled 2 milliseconds, 30 milliseconds and 120 milliseconds are applied both to bandpass filter 56 and to clipping circuit 52. An output of clipping circuit 52 is applied as an input to a summing amplifier 64. Each of the components 14, 24, 26, 28, 30, 34, 36, 38, 40, 42, 44, 50 and 52 appearing within the dash block 16 forms a "b'otch" generator. The summing amplifier 64 in one embodiment also receives similar blotch generated signals from other blotch generators designated 66 and 68. Each of the three generators produces blotches for a third of the CRT display surface. The units 66 and 68 contain substantially the same components as shown in block 16 although the digital-to-analog converters may be connected differently so that the generated blotches are not shown in a symmetrical fashion on the various portions of the display face. An output of summing amplifier 64 is applied as inputs to a sample and hold circuit 70, a gate amplifier 72 and a further gate amplifier 74. Gate amplifier 72 has an input which is actuated to provide a sum presentation while gate amplifier 74 has an input which actuates this amplifier in a difference mode. An output of gate amplifier 74 is applied through a chopper circuit 76 to a further input of gate amplifier 72. An output of gate amplifier 72 is applied through a modulating circuit 78 to an attenuator 80 and then to the intensity grid of the CRT. A reverberation level input is applied to both attenuators 62 and 80. The second and third inputs to the sample and hold circuit 70 indicate the bearing angle and width of the audio beam and the bearing angle of the ship's stern. The output of the sample and hold circuit 70 indicates the amplitude and degree of coincidence of the signals from the summing amplifier 64 with the audio beam as modified to simulate effects of the stern. The modulator 78 receives an input from a gate which permits passage of the pulses over a section of the display corresponding to the area in which the sound pings are being generated. This may be set in the actual equipment from about 10° to 300°.

A further input labeled dwell gate provides an input to a buffer amplifier 82 which has outputs applied to the random pulse generator 12 and a reset matrix 84. Reset matrix 84 receives an input from a depression angle source and applies an output to random pulse time generator 48. The dwell time input is utilized to inactivate the random pulse time generators during the period of time between reception of all signals to be received after generation of one ping and the next sweep of the CRT. The depression angle input is utilized to simulate different angles of sonar generation and merely allows random pulse time generator 48 to be actuated at different starting output voltages.

While the above circuit connection description has included most of the blocks in a simulator, the operation description will describe only those portions which are pertinent to the present invention since the invention merely involves the generation of apparently random signals to be applied to a display such as a CRT and does not need to include all of the refinements shown such as dwell gates, depression angles and audio effects circuitry.

*Operation*

The clock circuits are used to provide inputs to gates 10 and 20 which actuate pseudorandom time pulse generators 12 and 22. The random time pulse generators may be of any desired complexity. The digital-to-analog converters 14 and 24 may be connected to the generators 12 and 22 in such a fashion that successive inputs do not necessarily provide successively larger outputs from the converters 14 and 24. Thus, there will be an apparent randomness in output potentials. Further, the converters in block 16 may be connected differently than the similar converters in blocks 66 and 68. The outputs as previously mentioned from converters 14 and 24 are summed in summing network 26 and applied as inputs to the delay generators 28 and 30. The generators 28 and 30 are alternately activated by the bearing pulse from flip-flop 32 to start the time delay. After a time delay determined by the amplitude of the signal from summing network 26, an output is applied through gate 38 to the one shot 40 and eventually to summing network 44. A further random pulse generator 48 which is similar in construction to generator 12 provides outputs to a converter 50 which again may be similar to converter 14. The output of converter 50 in one embodiment is a variable voltage level which is summed in network 44 with the level of the signal transmitted from pulse shaper 42. Thus, if the signal from converter 50 is of a large magnitude, the output from the summing network 44 will be a pulse having its base level at a high potential with respect to a given reference while, for a low magnitude signal from converter 50, the pulse will be of similar amplitude as for the previously described condition, but its base level will be low with respect to the above reference. The clipping circuit 52 passes only those portions of pulses extending above a fixed threshold level to the summing amplifier 64. The clipping threshold level is altered to obtain the effects of changing the sonar pulse width. Since the pulses from summing network 4 are narrow at their peaks and broad at their bases and since the base level is varied in an apparently random fashion the portions of the pulses at the output of clipping circuit 52 are of apparently random amplitude with base width varying as a function of amplitude. Changing the clipping threshold results in altering the reverberation blotches to simulate changing sonar pulse width. It should be noted that the converter 24 changes output voltage levels at a much slower rate than does converter 14. In addition, converter 50 changes output levels at a much slower rate than the zero degree bearing pulses occur. In one embodiment, approximately four pulses are applied to summing network 44 before the output of converter 50 changes significantly in amplitude. Thus, four pulses of a given intensity are applied to the CRT at a given angle on the display. The composite output of the summing amplifier 64 is then applied through amplifier 72 either in the sum or the difference mode and through modulator 78 and attenuator 80 to the grid of the CRT33.

The CRT33 as previously mentioned for this embodiment of the invention has a spiral sweep and the input from this simulator changes the intensity of the presentation to provide information on several successive revolutions in the same angle or general area of interest since each of the delays of a particular variable delay pulse generator are approximately the same on successive occurrences. Thus, the blotch is generated on the face of the CRT tube. Of course, on some occasions the modulator 78 will prohibit transfer of information and a proportion of the time the output from converter 50 will be at a level so low that no part of the summed signal from network 44 will exceed the clipping threshold of circuit 52. During these portions of time the spiral sweep beam will not be intensified to a visible level.

In the embodiment shown, two variable delay generators 28 and 30 are used. The reason for using two is that in some instances the time delay generator may not have time to fully recover after providing an output pulse before it receives another bearing pulse. With two time delay circuits, one generator has a complete cycle to recover before it is again activated.

As will be realized by those skilled in the art, circuitry may be added which will decrease the size of the blotches with increasing distance from the source of sonar information. Various other modifications may be made to the circuitry for specific simulation requirements. We wish to include all such modifications to our invention and to be limited by the scope of the appended claims in which we claim:

1. Display apparatus comprising, in combination:
   a spiral sweep display, including input means, which responds to intensity modulation of input signals supplied to said input means;
   first means for supplying trains of pulses said trains of pulses having different time delays with respect to a reference; and
   second means, connecting said first means to said input means, for randomly transmitting some of said trains of pulses to said input means, the pulses in a single train applied to the display forming a pattern on the display.

2. Apparatus as claimed in claim 1 wherein said second means includes means for randomly intensity modulating said trains of pulses.

3. Simulation display apparatus for providing a continuously changing random display of targets comprising, in combination:
   first random pulse generating means for generating pulses at random time intervals with respect to a reference;
   display means;
   variable attenuating means connected between said random pulse generating means and said display means, said variable attenuating means including control means and allowing transmission of signals there-through in response to reception of control signals at said control means; and second random pulse generating means connected to said control means of said attenuating means for applying thereto random control signals.

4. Apparatus as described in claim 3 wherein each train of pulses from said first means are each attenuated substantially the same amount by said attenuating means.

5. Display apparatus comprising, in combination:

first random voltage generating means for providing an output first randomly varying signal;

second random voltage generating means for providing an output second randomly varying signal;

intensity modulated spiral sweep display means including a zero reference through which the spiral sweep passes many times in one cycle, input signals supplied thereto modulating the intensity of the display;

means for supplying a reference signal in synchronism with the spiral sweep;

first summing means connected to said first and second generating means for receiving said first and second randomly varying signals therefrom, said first summing means providing a composite output third randomly varying signal;

variable time delay means connected to said first summing means and said means for supplying a reference signal respectively, said time delay means providing an output pulse fourth signal delayed in time from the occurrence of the reference signal an amout proportional to the amplitude of the third signal;

third random voltage generating means providing an output fifth signal having constant amplitude durations equivalent to generation of a plurality of fourth signal pulses;

second summing means connected to said third generating means and to said time delay means for receiving therefrom said fifth and fourth signals respectively, said second summing providing trains of output pulses wherein the pulses in each train are of substantially constant amplitude; and means connecting said second summing means to said display means for supplying the trains of pulses thereto.

6. Apparatus as claimed in claim 5 wherein:

the reference signal is a triggering pulse occurring at substantially the same time as the sweep passes through the zero reference, the triggering pulse actuating the time delay means;

said second generating means operates at a slower varying rate than said first generating means; and the output voltage of said first summing means is more representative of changes in amplitude of said second generating means than of said first generating means.

7. Apparatus as claimed in claim 5 wherein said variable time delay means comprises two time delay circuits operating alternately to allow recovery of the last used time delay circuit.

References Cited

UNITED STATES PATENTS 3,291,885  12/1966  Eisele _____ 35—10.4

RODNEY D. BENNETT, *Primary Examiner.*

T. H. TUBBESING, *Assistant Examiner.*